E. A. OUTCALT.
VEHICLE RUNNING GEAR.
APPLICATION FILED APR. 29, 1918.
1,287,408.
Patented Dec. 10, 1918.
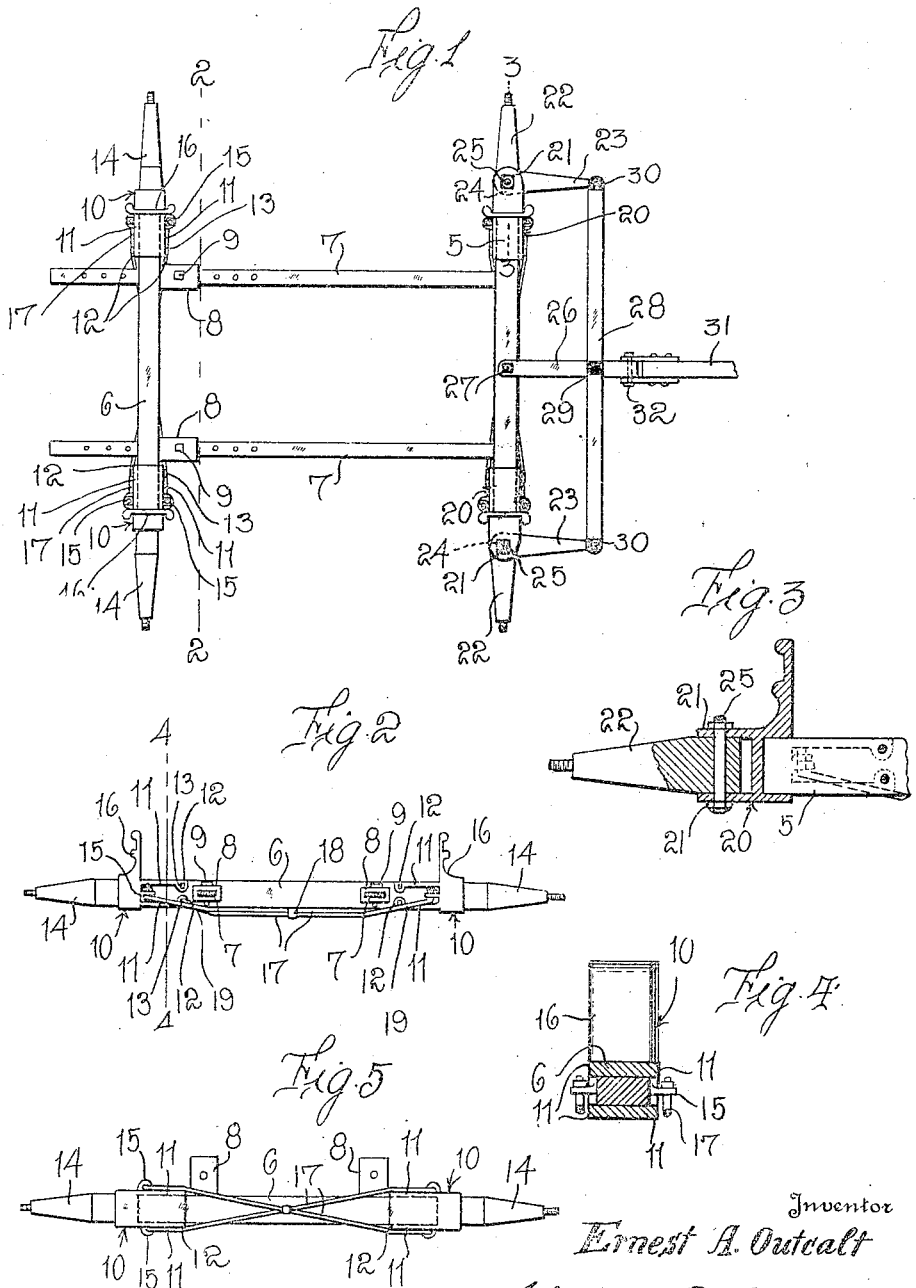

UNITED STATES PATENT OFFICE.

ERNEST A. OUTCALT, OF LIMERIDGE, WISCONSIN

VEHICLE RUNNING-GEAR.

1,287,408.  Specification of Letters Patent.  Patented Dec. 10, 1918.

Application filed April 29, 1918. Serial No. 231,466.

*To all whom it may concern:*

Be it known that I, ERNEST A. OUTCALT, a citizen of the United States, residing at Limeridge, in the county of Sauk and State of Wisconsin, have invented certain new and useful Improvements in Vehicle Running-Gears, of which the following is a specification, reference being had to the accompanying drawings.

This invention relates to an improved running gear for vehicles and has for its primary object to provide a simple and durable gear construction wherein the spindles for the front wheels are pivotally mounted upon the ends of the front axle and operatively connected to the vehicle tongue or pole whereby the use of the usual fifth wheel may be dispensed with.

It is also another object of the invention to provide a running gear having front and rear axles of improved construction, each axle being provided with intersecting truss rods extending beneath the axle and connected to the ends of the axle on relatively opposite sides thereof.

It is also one of the detail objects of the invention to provide a wagon stake and skein or spindle for the rear axle in the form of a single integral casting having means whereby said casting may be rigidly fixed to the end of the axle.

And it is a further general object of the invention to improve and simplify the construction of vehicle running gears, increase the strength and durability thereof, and effect a material saving in their manufacturing cost.

With the above and other objects in view, the invention consists in the improved combination, construction and relative arrangement of the several parts as will be hereinafter more fully described, subsequently claimed and illustrated in the accompanying drawing in which similar reference characters designate the corresponding parts throughout the several views, and wherein:

Figure 1 is a top plan view of a vehicle running gear constructed in accordance with the preferred embodiment of my invention;

Fig. 2 is a section taken on the line 2—2 of Fig. 1;

Fig. 3 is an enlarged detail section through one end of the front axle taken on the line 3—3 of Fig. 1;

Fig. 4 is a section taken on the line 4—4 of Fig. 2; and

Fig. 5 is a bottom plan view of the rear axle.

Referring in detail to the drawing, 5 designates the front axle bar of the running gear and 6 the rear axle bar. These axles are of square or rectangular form in cross section and preferably constructed of wood. In the front axle 5 in spaced relation to the ends thereof the reach bars 7 are suitably fixed at one of their ends. These reach bars at their rear ends are adjustable through the sleeves 8 which are fixed to the front side face of the rear axle 6, said reach bars extending through openings in the axle coinciding with the sleeve bores. The reach bars are provided with spaced openings to receive bolts 9 engaged in the sleeves 8. It will thus be seen that the rear axle 6 can be readily adjusted upon the reach bars toward or from the front axle 5.

To each end of the rear axle 6, a casting generally indicated by the numeral 10 is secured. This casting includes the integrally connected parallel arms 11 which are adapted for engagement upon the upper and lower sides of the axle and have terminal ears 12 formed upon their opposite longitudinal edges to project over the side faces of the axle. Suitable bolts shown at 13 are insertible through apertures in these ears and coinciding transverse openings in the axle whereby the casting may be rigidly fixed upon the axle. A longitudinally extending wheel hub skein or spindle 14 is integrally formed with the connected ends of the arms 11, and between said arms at their connected ends apertured lugs 15 project inwardly. The particular purpose of these lugs will hereinafter become apparent. A vertically disposed stake or standard 16 is integrally formed with the upper arm of the casting 11 at its outer end.

Intersecting truss rods 17 have their obliquely disposed medial portions extending beneath the axle bar and securely clamped or held together at the point of intersection by a bolt 18. The end portions of the respective truss rods are inclined upwardly as at 19 along the relatively opposite side faces of the axle bar and are connected at their extremities to the apertured lugs 15 of the casting 10. These truss rods thus secured to the ends of the axle, effectively brace and reinforce the axle against the distorting or disrupting effects of transverse strains.

Castings 20 are likewise secured upon the ends of the front axle 5, and these castings are similar in construction to those above described with the exception that the castings 20 are not provided with integral hub skeins or spindles but are formed upon their outer ends with the vertically spaced lugs or ears 21. The skeins or spindles 22 for the front vehicle wheels are provided at their inner ends with the integral arms 23 extending at right angles to the axis of the spindle. The integral connection with the arm and the spindle is in the form of a cylindrical bearing knuckle 24 which is adapted to be engaged between the spaced lugs 21 on the casting 20. These lugs and the bearing 24 are provided with openings to receive a pivot bolt or rod 25. A forwardly extending bar 26 is pivotally connected as at 27 to the center of the front axle 5 and a transverse bar 28 is pivoted intermediate of its ends as at 29 to the bar 26 adjacent the forward end thereof. The extremities of said transverse bar are pivotally connected as shown at 30 to the forward ends of the arms 23 of the respective wheel spindles 22. The vehicle tongue 31 is connected by means of a hinge rod or bolt 32 to the forward end of the bar 26 for vertical swinging movement with respect thereto.

From the foregoing description taken in connection with the accompanying drawing, the construction, manner of operation and several advantages of my invention will be readily understood. It will be seen that I have dispensed with the usual bolsters and fifth wheel and the wagon stakes or standards 16 on the front and rear wheel axles will always be in line. The usual king bolt is of course also eliminated. The arrangement of the truss rods for the front and rear axles as herein disclosed also provides a very effective racing or strengthening means for the axle. When the tongue 31 of the vehicle swings to the right or the left as the team is directed by the driver, the front wheels are simultaneously turned through the medium of the bar 28 and the arms 23, the skeins or spindles 22 being always at right angles to the tongue. Thus the wagon or vehicle will properly follow the team. The several parts of the gear are of very simple construction, but should any part be broken it can be readily repaired or replaced at nominal cost. The device as a whole provides a vehicle running gear which will be relatively light in weight, inexpensive to manufacture and highly serviceable in practical use.

While I have herein shown and described the preferred construction and arrangement of the several elements, it is to be understood that the device is susceptible of considerable modification therein and I therefore reserve the privilege of adopting all such legitimate changes as may be fairly embodied within the spirit and scope of the invention as claimed.

Having thus described my invention, what I claim is:—

1. In combination with a vehicle axle, a casting on each end of the axle having spaced opposed arms fixed to the axle, and a pair of longitudinally extending truss rods fixed at their ends to said castings between the connected ends of said arms.

2. In combination with a vehicle axle, obliquely disposed intersecting truss rods extending beneath the axle, the end portions of each truss rod being upwardly inclined and extending along the relatively opposite side faces of the axle, the extremities of said truss rods being fixed to the ends of the axle.

3. In combination with a vehicle axle, obliquely disposed intersecting truss rods extending beneath the axle, the end portions of each truss rod being upwardly inclined and extending along the relatively opposite side faces of the axle, the extremities of said truss rods being fixed to the ends of the axle, and means rigidly connecting the truss rods to each other at their point of intersection.

4. In combination with a vehicle axle, a casting having spaced parallel arms projecting in one direction and a wheel spindle projecting in the opposite direction, said arms being engaged upon the upper and lower sides of the axle at its end, means for rigidly securing the terminals of the arms to the axle, and an upstanding stake integrally formed with one of said arms.

5. In combination with a vehicle axle, a casting on each end of the axle having spaced parallel arms and means for securing the arms at their extremities to the axle, intersecting truss rods extending beneath the axle, and means for securing the ends of the truss rods to said castings.

In testimony whereof I hereunto affix my signature in the presence of two witnesses.

ERNEST A. OUTCALT.

Witnesses:
 ART COHOON,
 LILLIE OUTCALT.